US006668210B1

(12) United States Patent
Kim et al.

(10) Patent No.: US 6,668,210 B1
(45) Date of Patent: Dec. 23, 2003

(54) VENDING MACHINE FOR ENGRAVED MEDALS AND A METHOD OF AUTOMATICALLY ENGRAVING MEDALS

(75) Inventors: Jai Seung Kim, Seoul (KR); Chang Ho Sung, Seongnam-si (KR)

(73) Assignee: Fusence Co., Ltd., Seoul (KR)

( * ) Notice: Subject to any disclaimer, the term of this patent is extended or adjusted under 35 U.S.C. 154(b) by 0 days.

(21) Appl. No.: 10/357,680

(22) Filed: Feb. 4, 2003

(51) Int. Cl.[7] .................... G06F 17/00
(52) U.S. Cl. .................... 700/235; 700/233; 221/6; 409/96; 409/85
(58) Field of Search .................... 700/224, 232, 700/233, 235; 221/6, 9, 14, 17; 409/96, 85

(56) References Cited

U.S. PATENT DOCUMENTS 5,088,864 A * 2/1992 Yanagida .................... 700/163
5,504,688 A * 4/1996 Letourneau .................... 700/95
5,569,003 A * 10/1996 Goldman et al. .................... 409/132
6,021,417 A * 2/2000 Massarksy .................... 715/502
6,059,495 A * 5/2000 Mueller et al. .................... 409/197
6,385,628 B1 * 5/2002 Massarsky .................... 715/502

* cited by examiner

*Primary Examiner*—Khoi H. Tran
(74) *Attorney, Agent, or Firm*—Porter, Wright, Morris & Arthur, LLP

(57) ABSTRACT

The present invention is to provide a vending machine for engraved medals and a method of automatically engraving medals wherein an engraver is contained in the vending machine, and if a coin or a note is inserted into the vending machine and a starting button is pushed according to messages displayed on a monitor, a desired type of medal is selected and loaded on a bed of the engraver to be engraved according to a selected image, and the engraved medal is taken out outside the vending machine.

11 Claims, 21 Drawing Sheets

VENDING MACHINE FOR ENGRAVED MEDALS AND A METHOD OF AUTOMATICALLY ENGRAVING MEDALS

FIELD OF THE INVENTION

The present invention relates to a vending machine for engraved medals which engraves desired photographs or pictures, etc. on medals of metal or non-metal to sell customers the engraved medals automatically and a method of automatically engraving medals by using the vending machine. More particularly, the present invention relates to a vending machine for engraved medals and a method of automatically engraving medals wherein an engraver is contained in the vending machine, and if a coin or a note is inserted into the vending machine and a starting button is pushed according to messages displayed on a monitor, a desired type of medal is selected and loaded on a bed of the engraver to be engraved according to a selected image, and the engraved medal is taken out outside the vending machine.

BACKGROUND OF THE INVENTION

Conventional engravers for medals engrave semi-automatically desired images on medals of metal or non-metal, so that the engraved medals can be used as memorial purposes or presents.

In order to engrave a desired image on a medal by using the conventional engraver, the desired image has to be input to a computer through a camera or a scanner.

If the desired image is input to the computer, a desired shape and size of a medal is selected and loaded on a predetermined position of a bed movable along a Y-axis, wherein a bilateral adhesive tape is attached on the back face of the medal, so that the medal can be fixed on the bed during processing the medal.

In a state that the medal has been loaded on the bed, the engraver is run by the computer, and a slider having a diamond tool, which is configured to move up and down, reciprocates along an X-axis, while the bed moves toward the Y-axis simultaneously. By these procedures, the input image can be engraved on the medal.

After engraving on the medal has been completed, the bed returns to its initial position and then a user can take the medal from the bed. Thus, all the procedures are over.

The conventional engraver, however, has various the following disadvantages.

Firstly, in order to operate the engraver, an operator or a manager should help users operate the engraver, since the machine was difficult to manipulate. Therefore, a self-service sale using a small space was not possible.

Secondly, costs of operating and managing the conventional engravers are high.

Thirdly, loading of medals on correct coordinates of the bed to engrave desired images in the center of the medals, was difficult, and it depended on a manager's skill. Although the manager was skilled, it took much time to load the medals on correct coordinates of the bed since shapes and sizes of medals were various.

Lastly, it was inconvenient that the bilateral adhesive tape had to be removed from the back face of the medal after engraving.

SUMMARY OF THE INVENTION

Accordingly, an object of the present invention is to provide a vending machine for engraved medals and a method of automatically engraving medals wherein an engraver is contained in the vending machine, and if a coin or a note is inserted into the vending machine and a starting button is pushed according to messages displayed on a monitor, a desired type of medal is selected and loaded on a bed of the engraver to be engraved according to a selected image, and the engraved medal is taken out outside the vending machine, so that the medal can be used as accessories for cellular phones, necklaces and key holders, etc.

Another object of the present invention is to use the medals having names or telephone numbers engraved for helping missing children contact their parents or guardians.

Another object of the present invention is to provide a vending machine for automatically engraving medals as many as the customer wants.

In order to obtain the above objects, the vending machine for engraved medals according to the present invention comprises a housing; a plurality of lighting lamps contained in the housing to provide illuminance to a subject or an image; a key operating board for a user to input signals for engraving a medal; a money sensing part to detect a coin or note inserted by electrical signals; a camera fixed in the housing to take photographs of the image according to signals from a controller; ROM (read only memory) in which background images and color data as well as programs for controlling the vending machine are memorized; RAM (random access memory) to temporarily store data including the image data photographed by the camera; a controller to recognize the data input from the above components and perform a control program provided by the ROM, and then to output control signals to each component; an image processor to forward image signals output from the controller to a user and an exterior monitor; a monitor for a user to display messages by which the user can input necessary data including background images, a photographed image and an image to be engraved at each stage under the control of the image processor; an exterior monitor provided outside the housing to display procedures of manufacture and a type of the medal and commercials for the vending machine under the control of the image processor; a medal supplier to provide a medal to an engraver in accordance with output signals from the controller; and the engraver automatically engraving the photographed image on the selected medal by embossing or intaglio in accordance with control signals output from the controller.

The engraver in the present invention comprises a diamond tool provided on a slider which moves along an X-axis and engraves the images on the medal; a bed provided on a base below the slider to move along a Y-axis and to have the medal loaded thereon; a stacker provided on one side of the base to contain unengraved medals thereon; side plates provided in opposite each other on both sides of the base; a horizontal slider provided on a guide rail fixed between the side plates to move horizontally within a section predetermined by a horizontal actuating means; a vertical slider fitted to a guide stick fixed on the horizontal slider to move up and down by a vertical actuating means; a lifting board elastically mounted on the vertical slider by an elastic member to move up and down; a first holding means of medals provided on the lower end of the lifting board to hold the medal on the stacker or on the bed; a second holding means having its upper end in line with the upper side of the bed at predetermined coordinates to hold medals while the medal is being engraved; and a sensing means mounted on the vertical slider to be operated by the lift of the lifting board so that the first and second holding means are driven in turn.

According to the present invention, a method of automatically engraving medals by using the vending machine is provided and the method comprises the steps of:

detecting whether a coin or a note is normally inserted; if the money has been normally inserted, selecting a type and color of a medal according to messages on a monitor; selecting a desired background image on the monitor which displays background images memorized in the ROM; selecting and inputting the number of persons to be photographed and the number of shots; photographing the persons by the camera for the number of times of shots; selecting an image to be engraved among the photographed images and combining the selected image with the selected background image; selecting shadow density of the image to be engraved on the medal; inputting a name or a telephone number, etc. to be engraved on the medal; loading the selected medal on an engraver; performing to engrave the medal on the engraver and displaying procedures of engraving on the exterior monitor; and detecting whether further engraving of the same image on other medals is requested, and if yes, repeating the step of loading the selected medal, and if no, finishing the procedures.

BRIEF DESCRIPTION OF THE DISCHARGINGS

The accompanying drawings, which are included to provide a further understanding of the invention and are incorporated in and constitute a part of this specification, illustrate an embodiment of the invention and together with the description serve to explain the principles of the invention, wherein:

FIGS. 1*a* and 1*b* are perspective views of vending machines for engraved medals according to the present invention;

Figure 3:
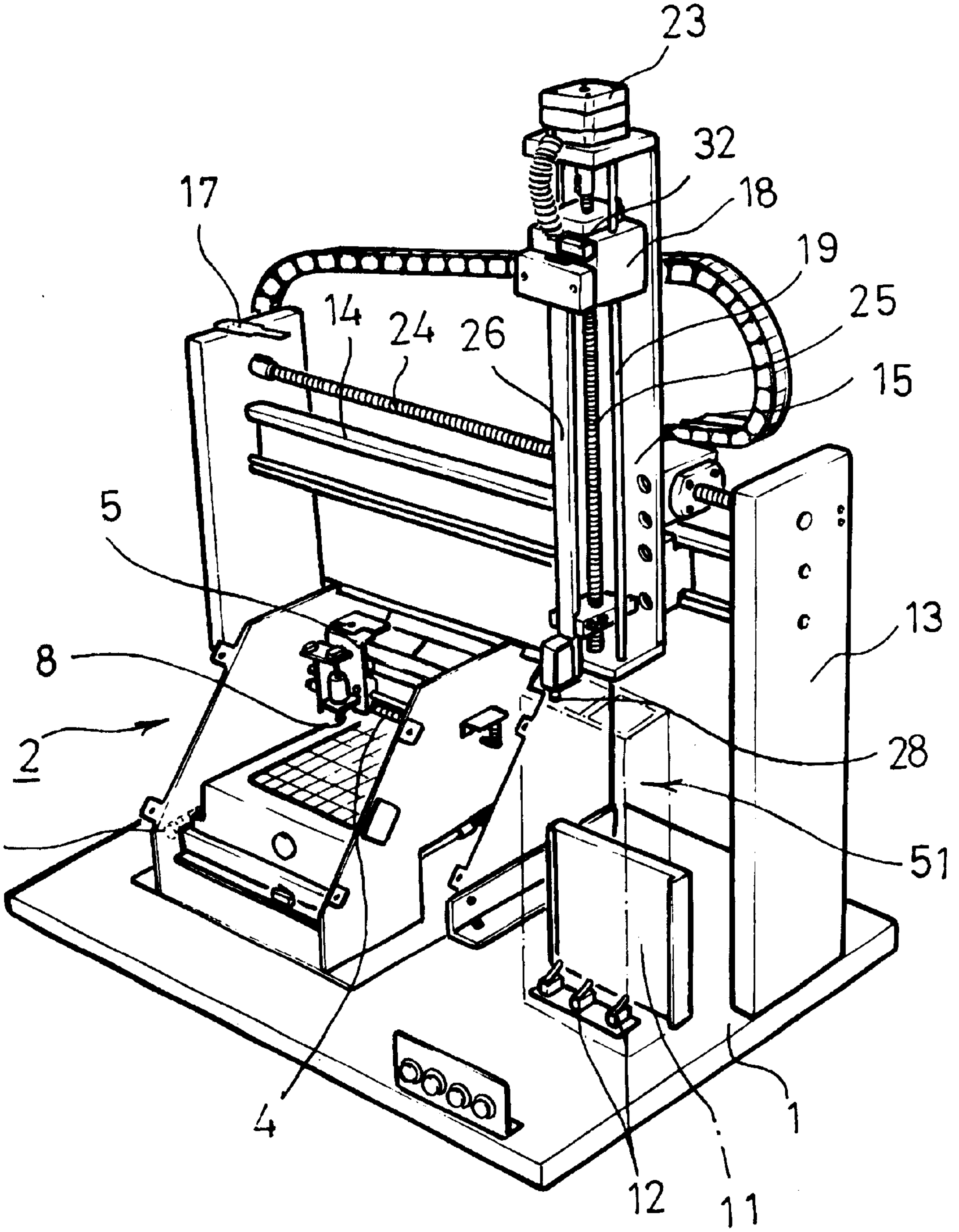
FIG. 3 is a perspective view showing an embodiment of the automatic medal engraver according to the present invention.
Figure 4A:
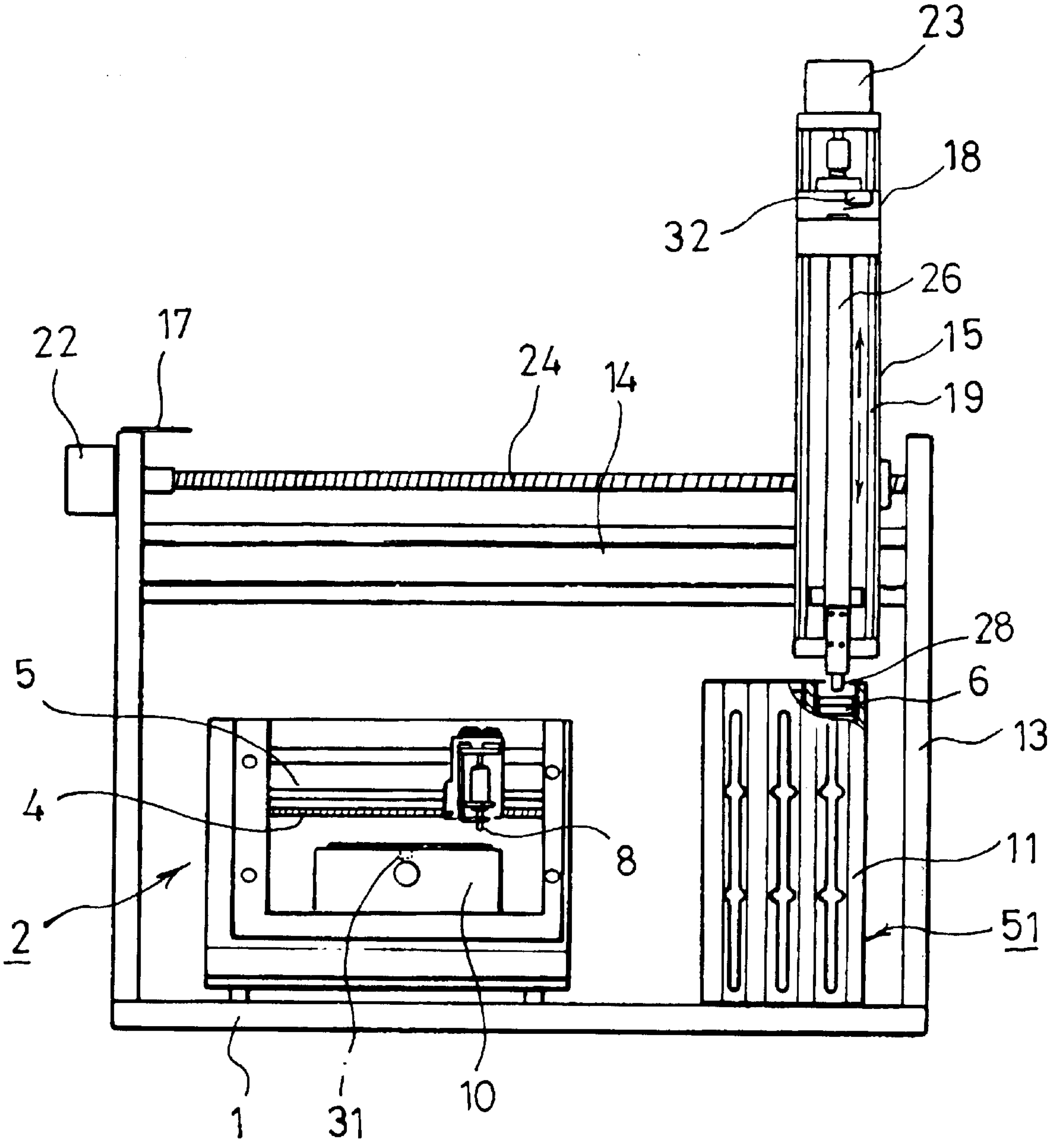
Figure 4B:
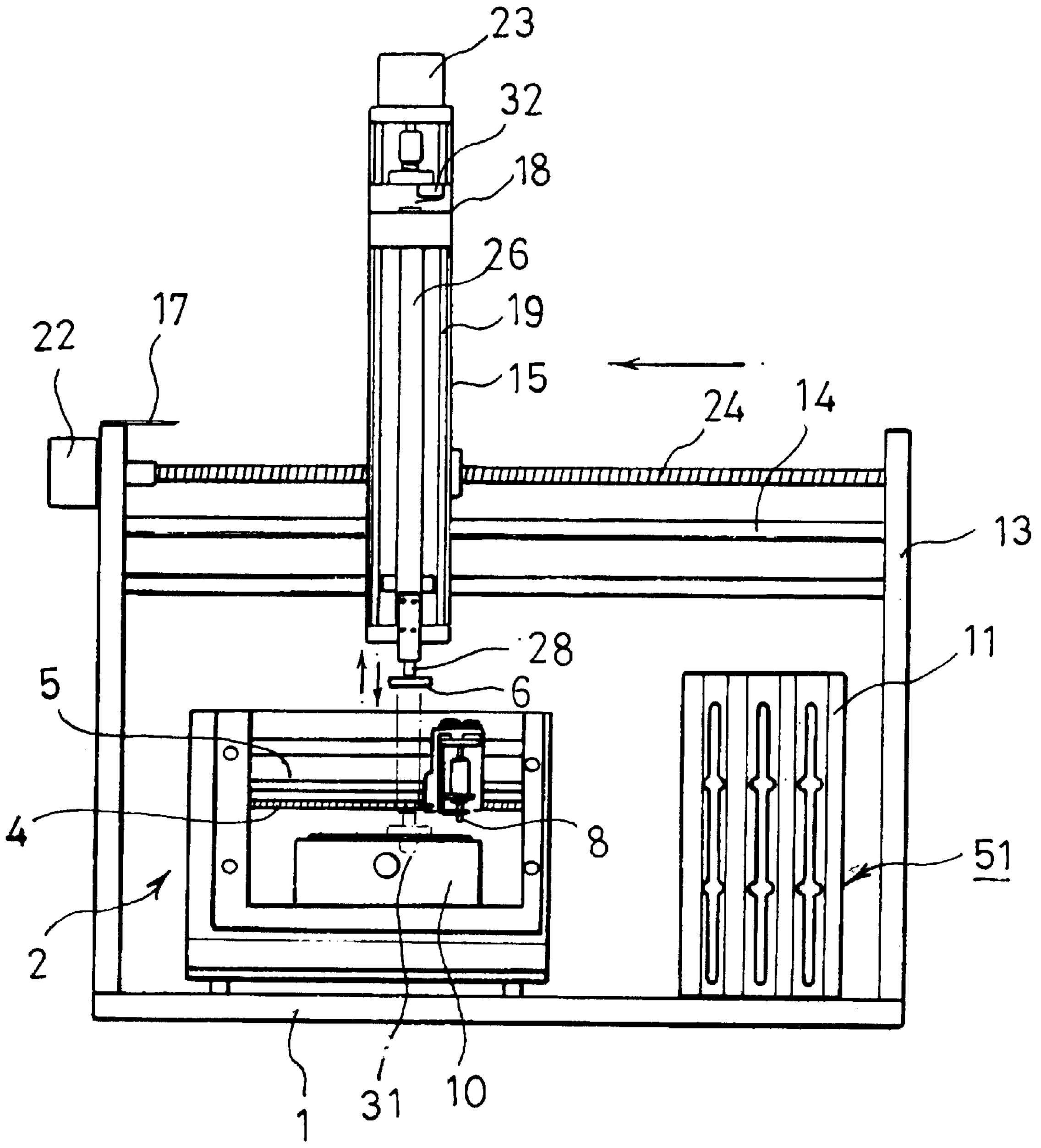
Figure 4C:
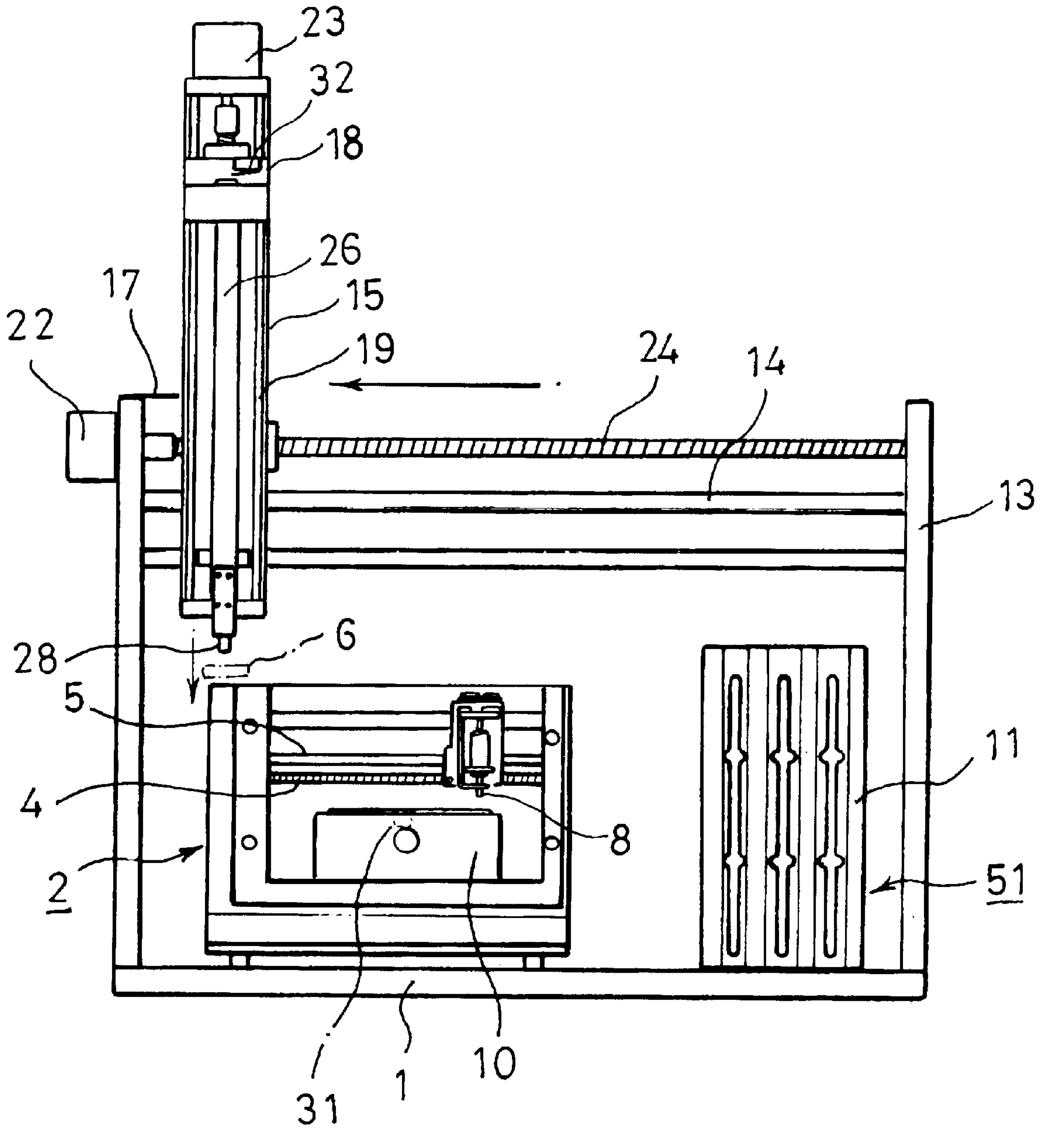
Figure 5:
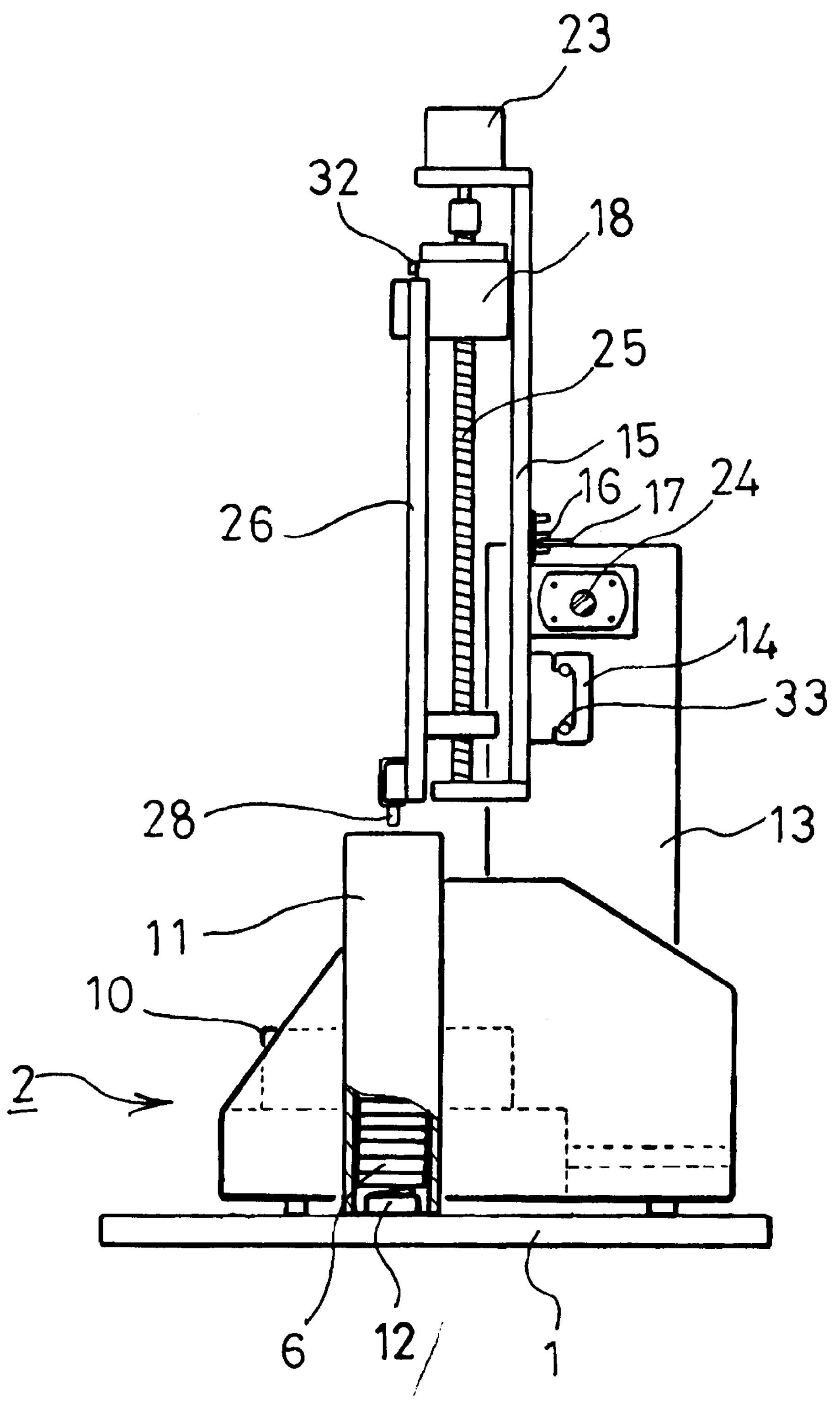

FIGS. 4*a* to 4*c* are front views of FIG. 3, wherein FIG. 4*a* shows a state that a first holding means is placed in an initial position;

FIG. 4*b* shows a state that the first holding means is placed above a loading position; and FIG. 4*c* shows a state that the first holding means is placed in an unloading position;

FIG. 5 is a side view of FIG. 4*a;*

Figure 6:
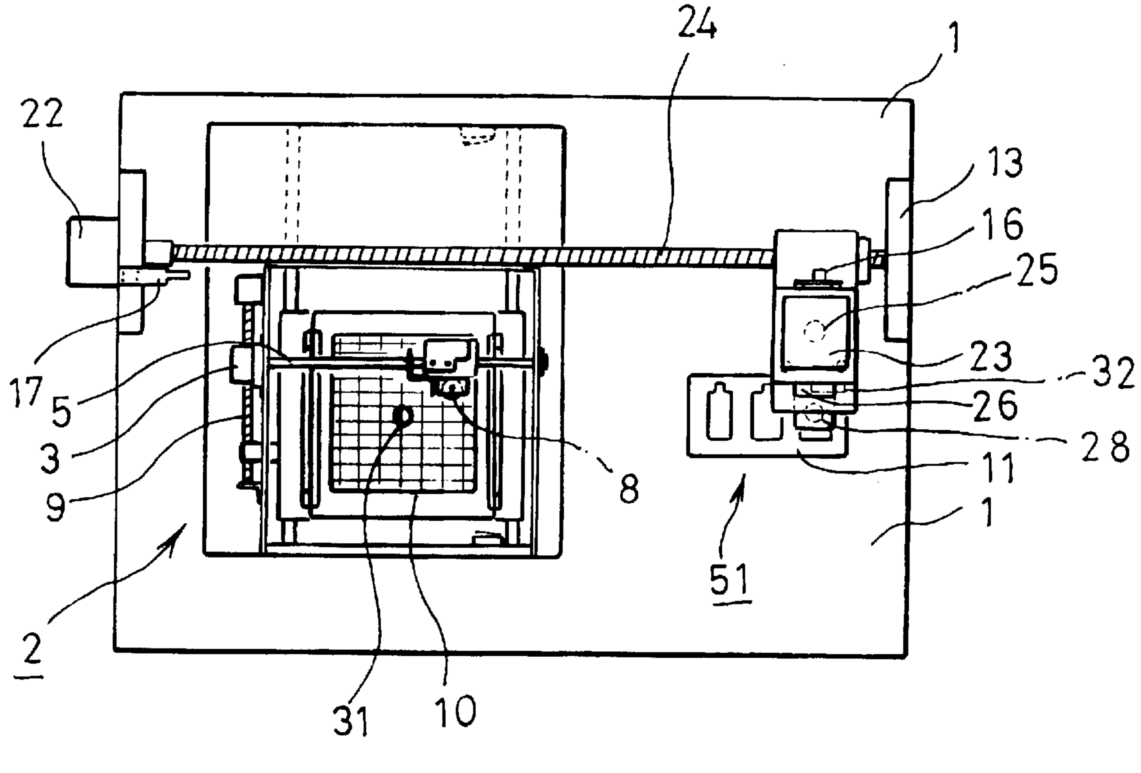

FIG. 6 is a plane view of FIG. 4*a;*

Figure 7A:
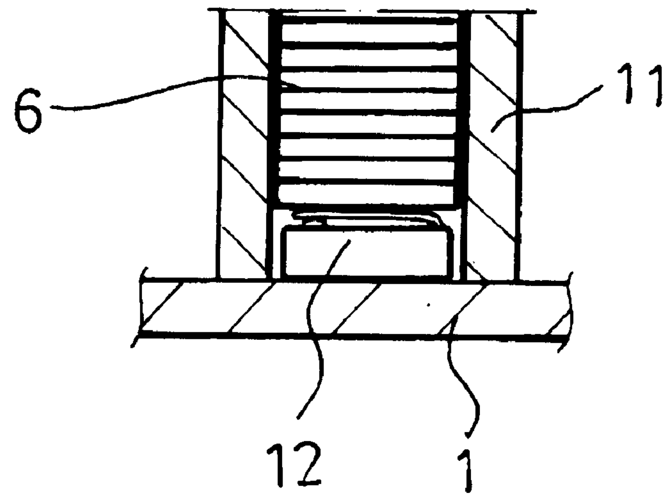
Figure 7B:
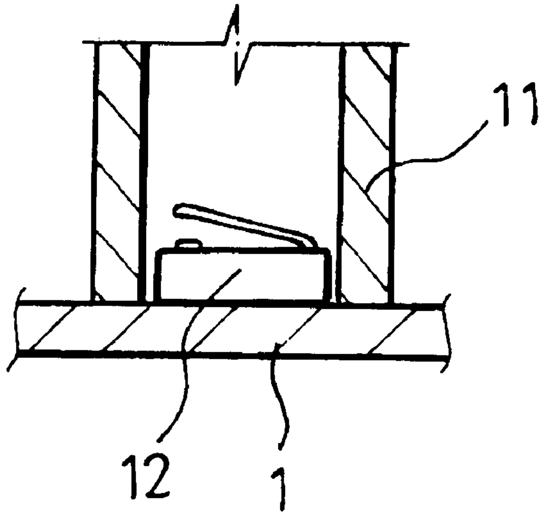
Figure 8:
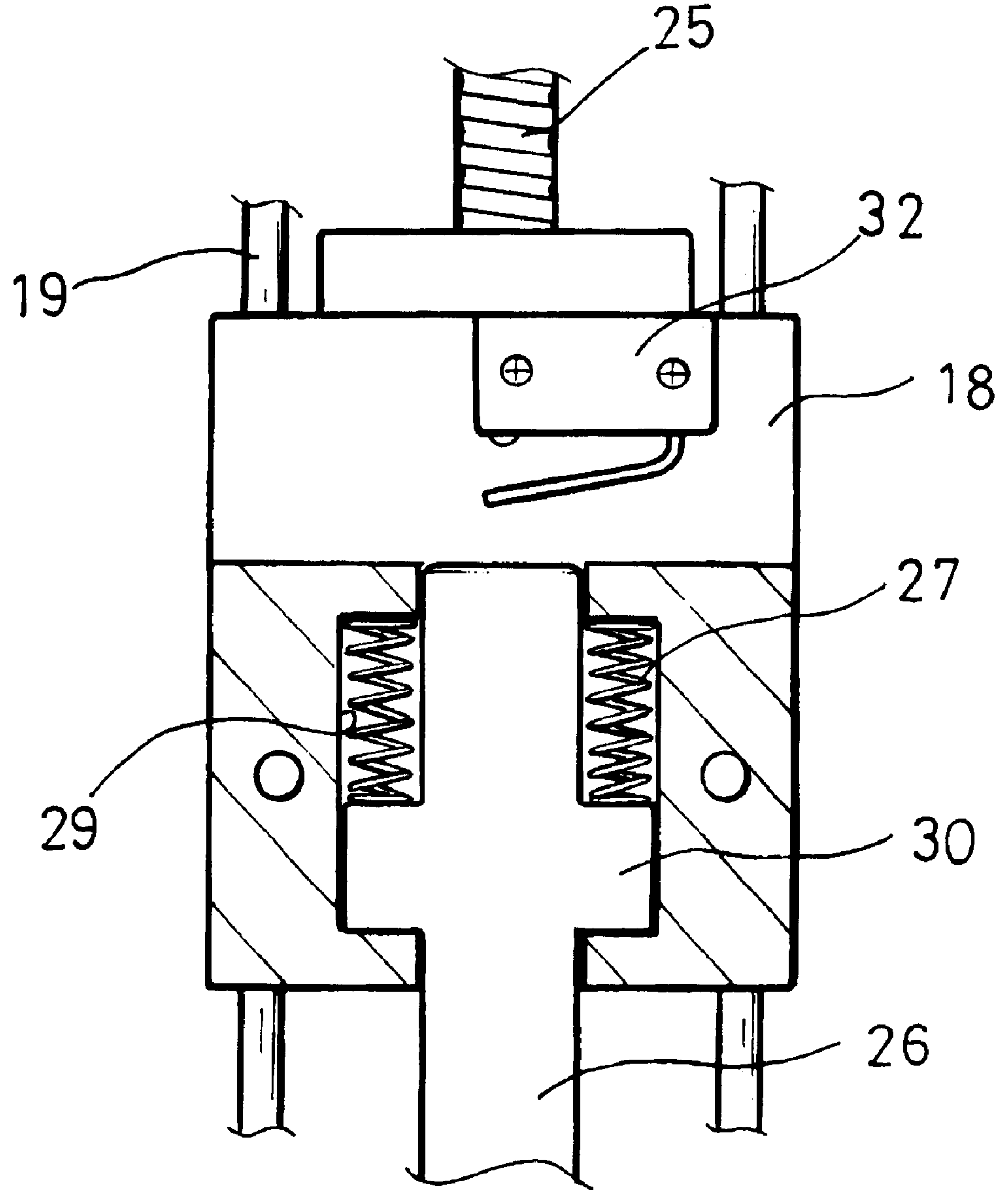
Figure 9:
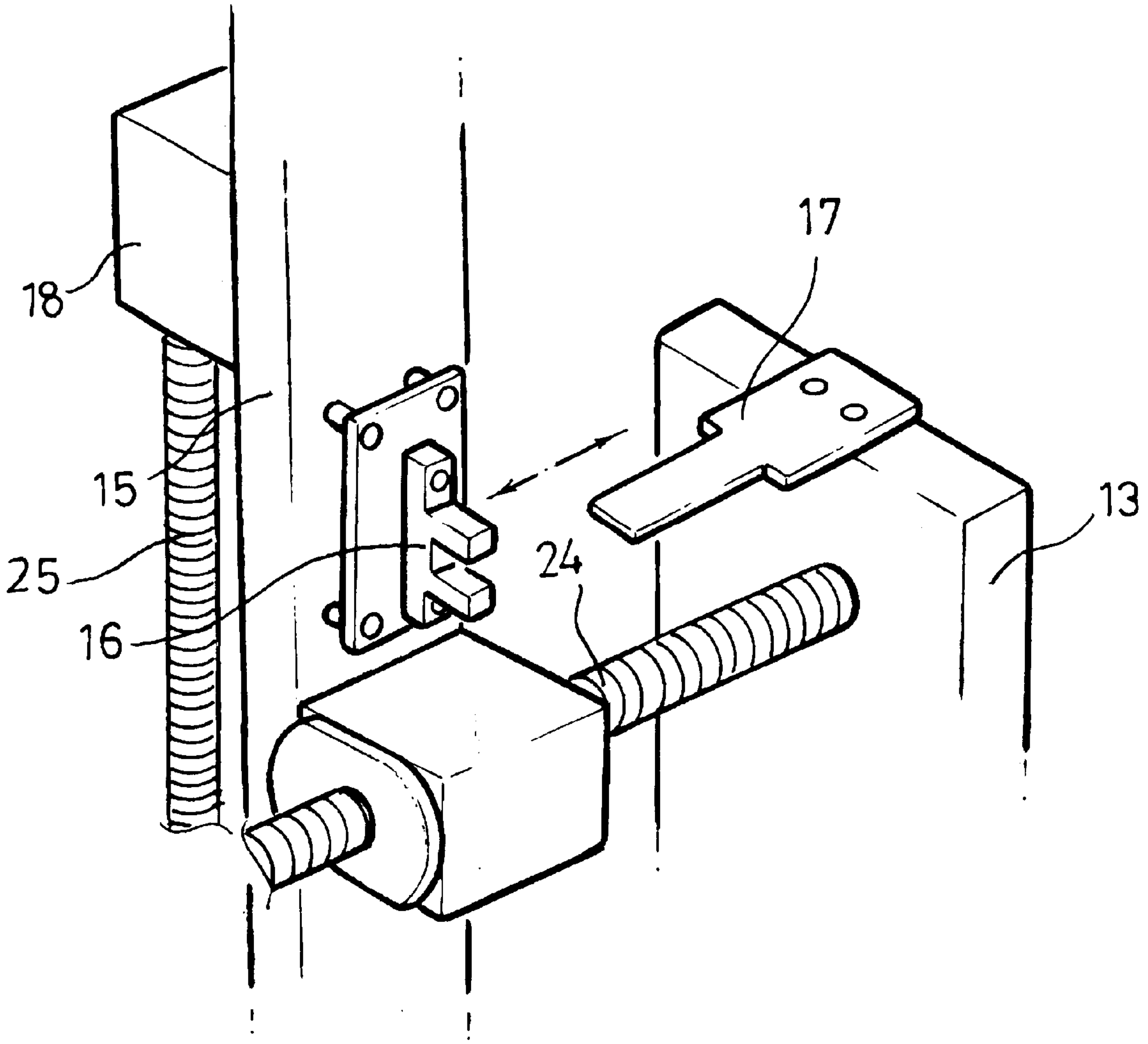
Figure 10:
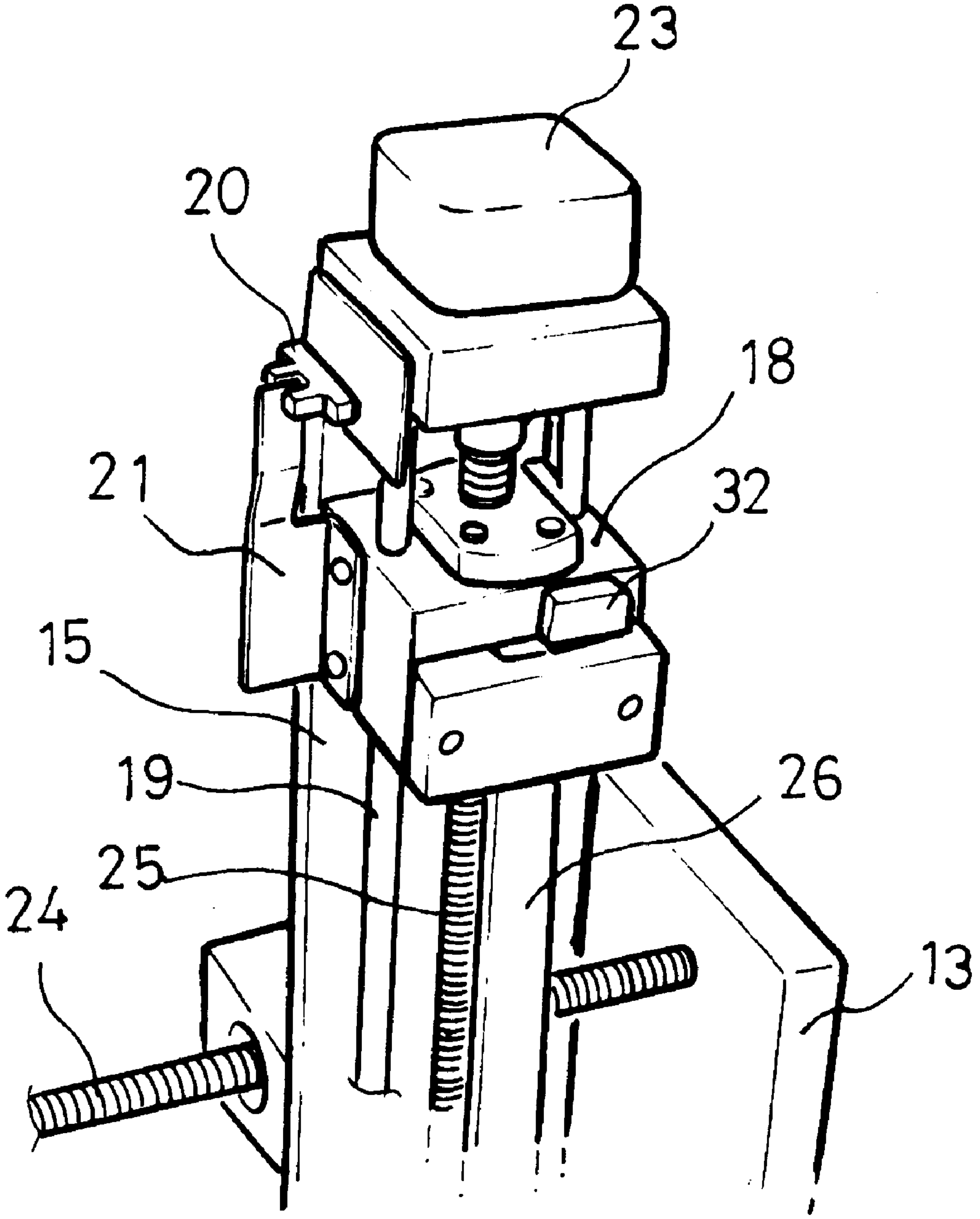
Figure 11:
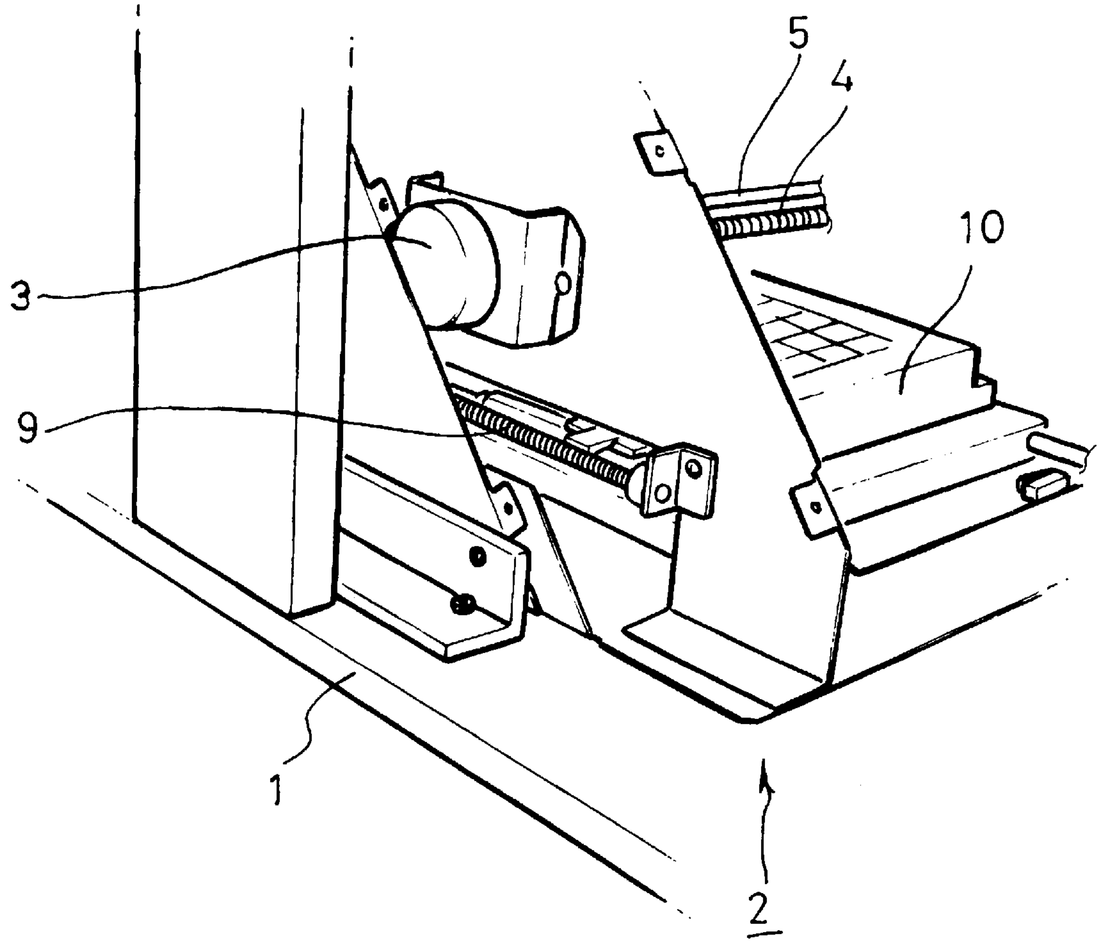
Figure 12A:
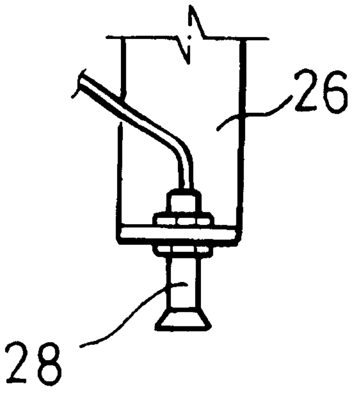
Figure 12B:
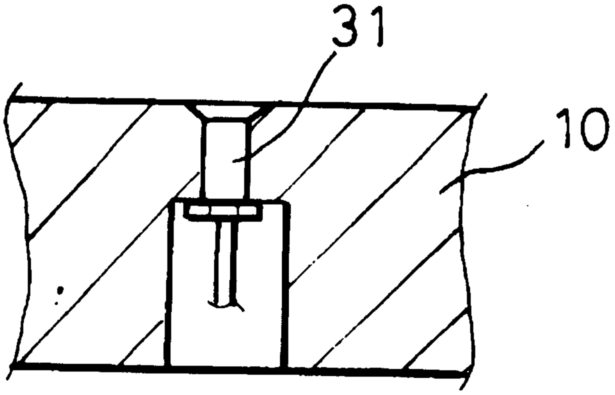
Figure 13:
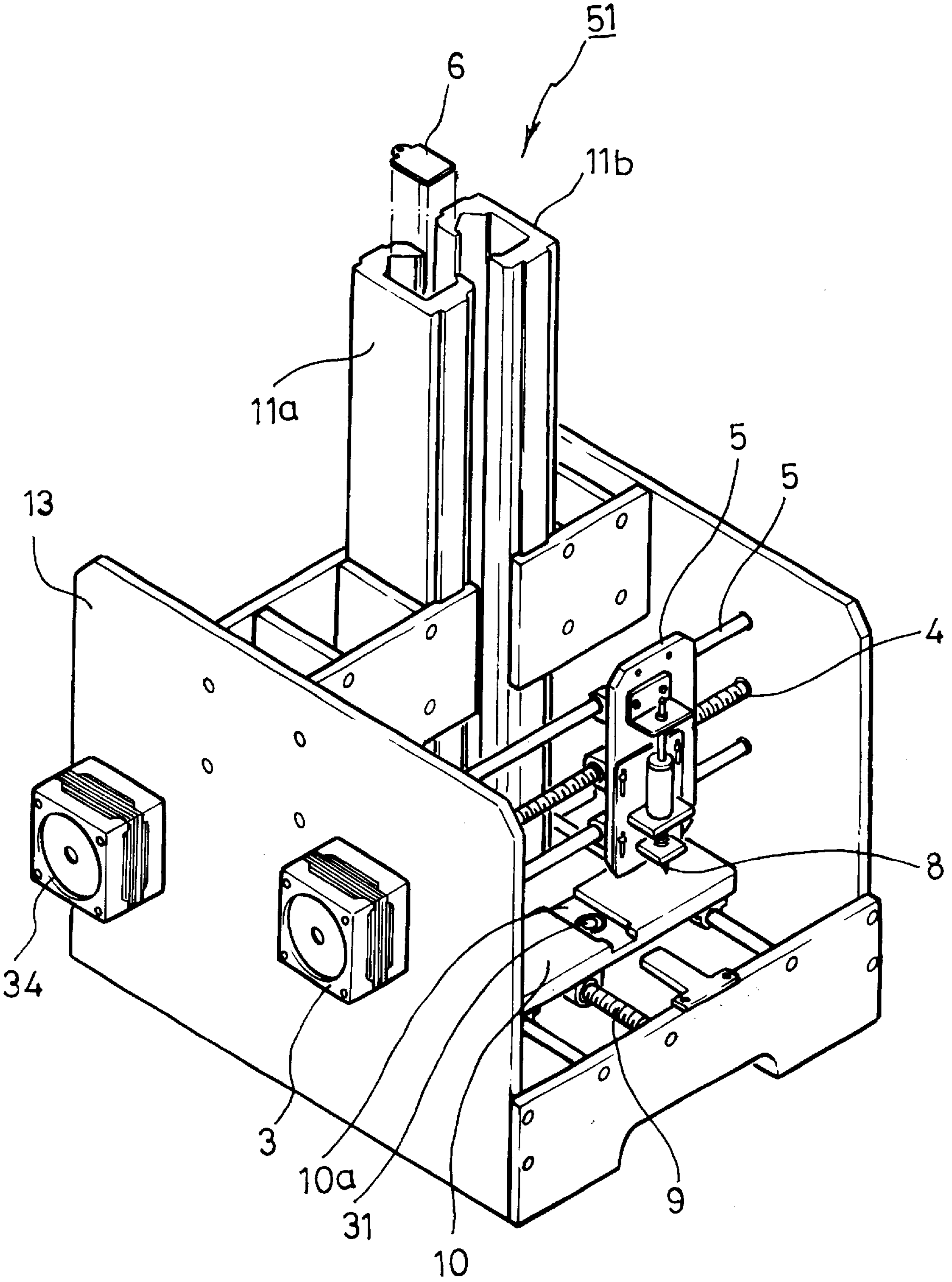
Figure 14:
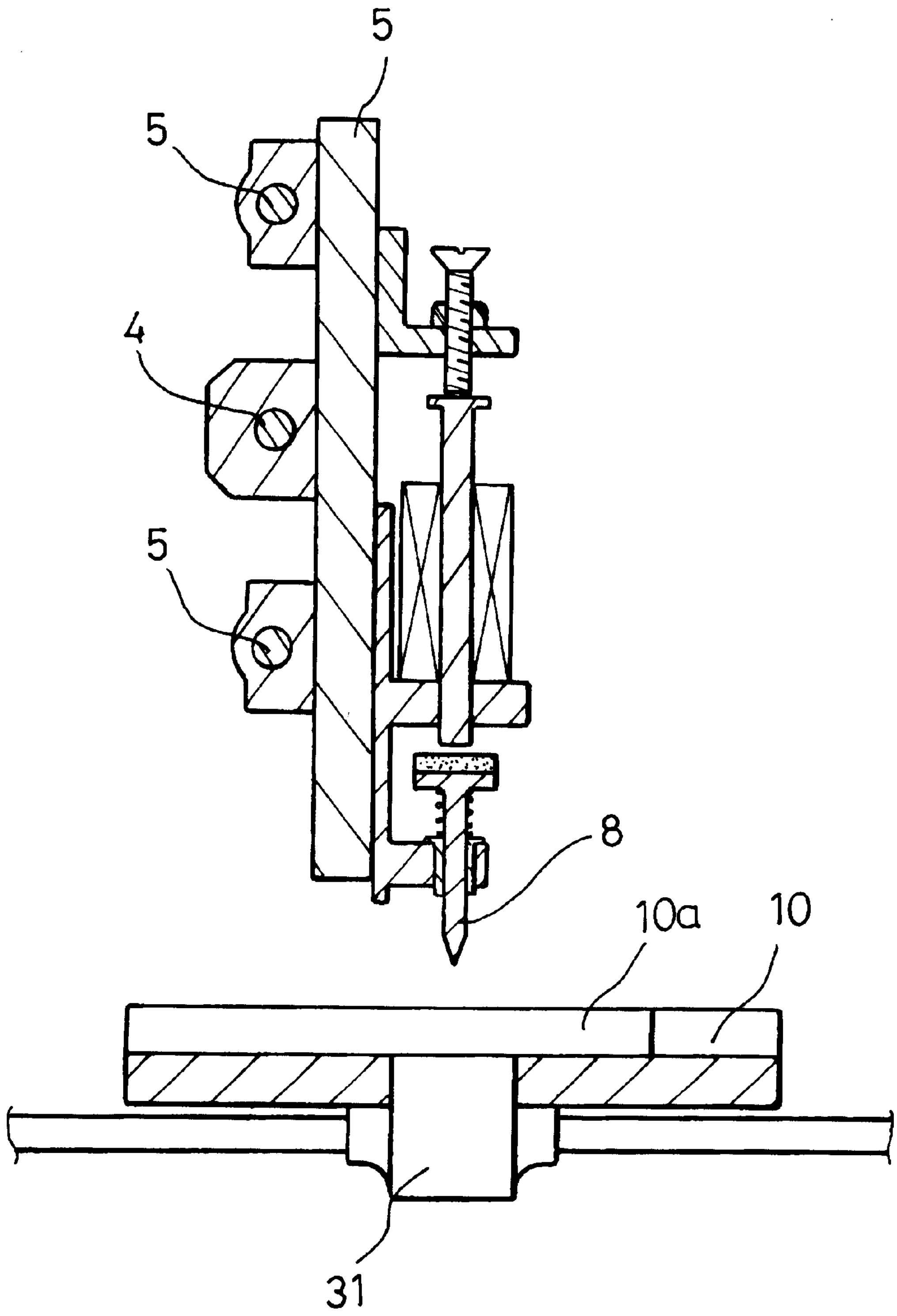
Figure 15:
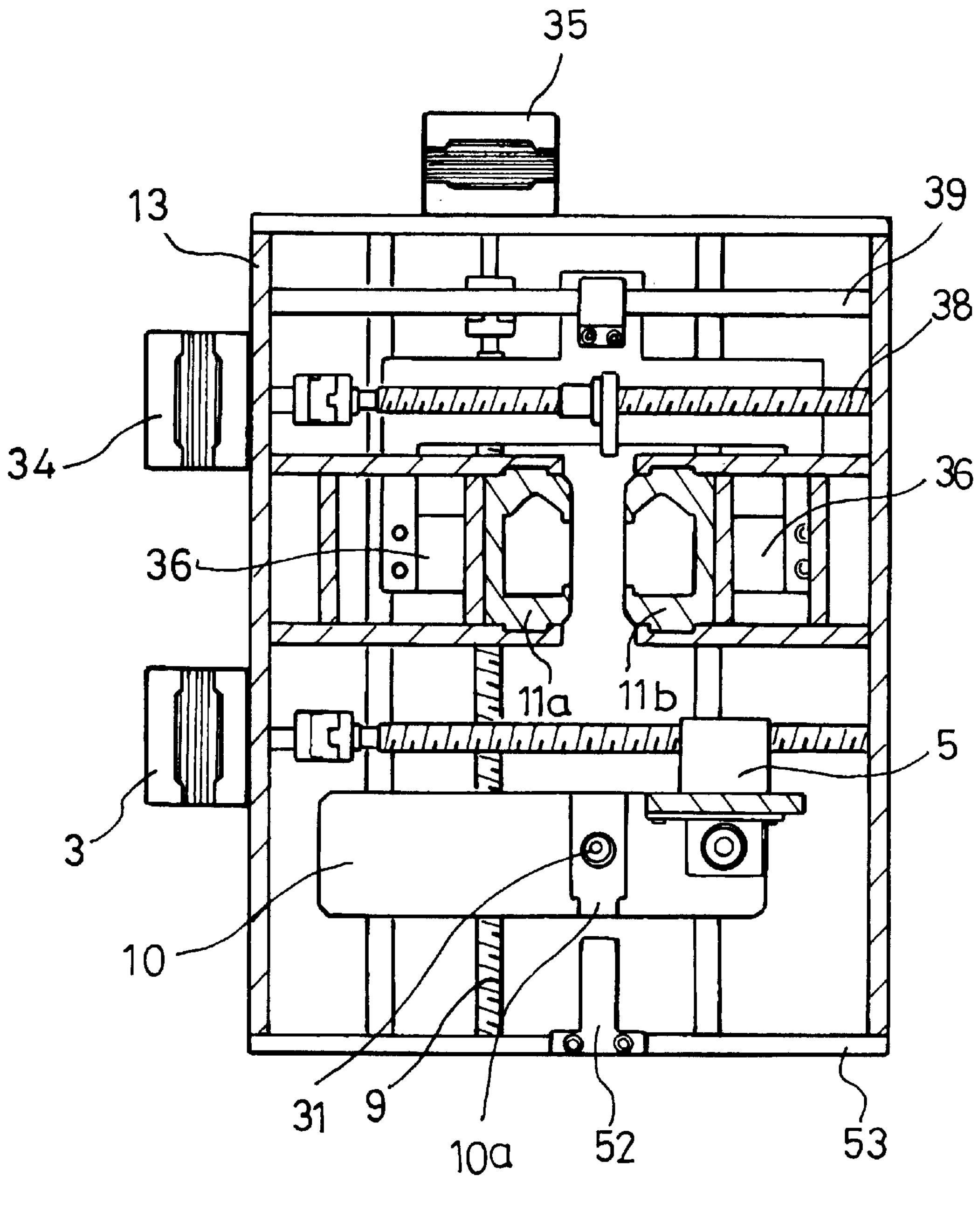
Figure 16:
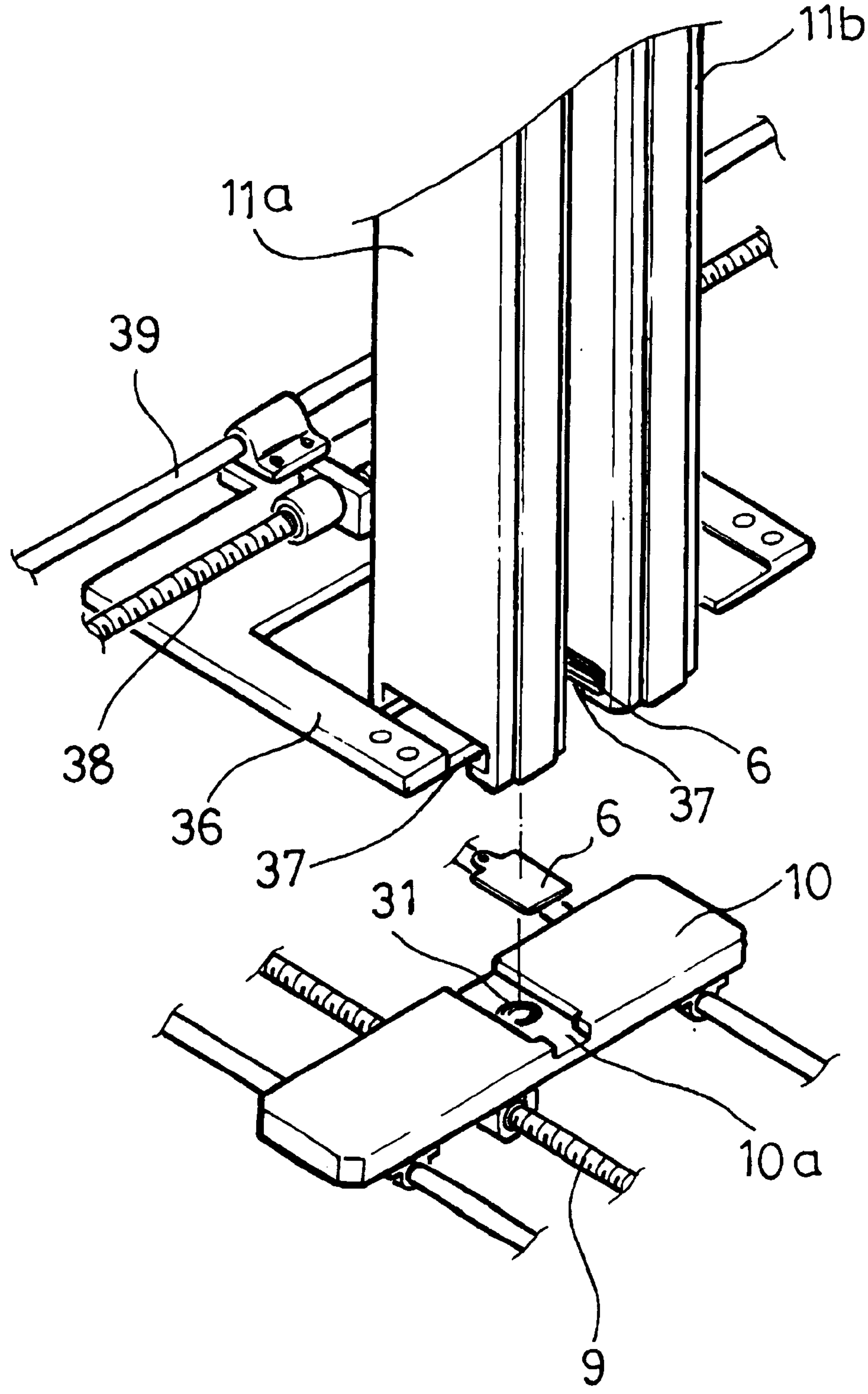
Figure 17:
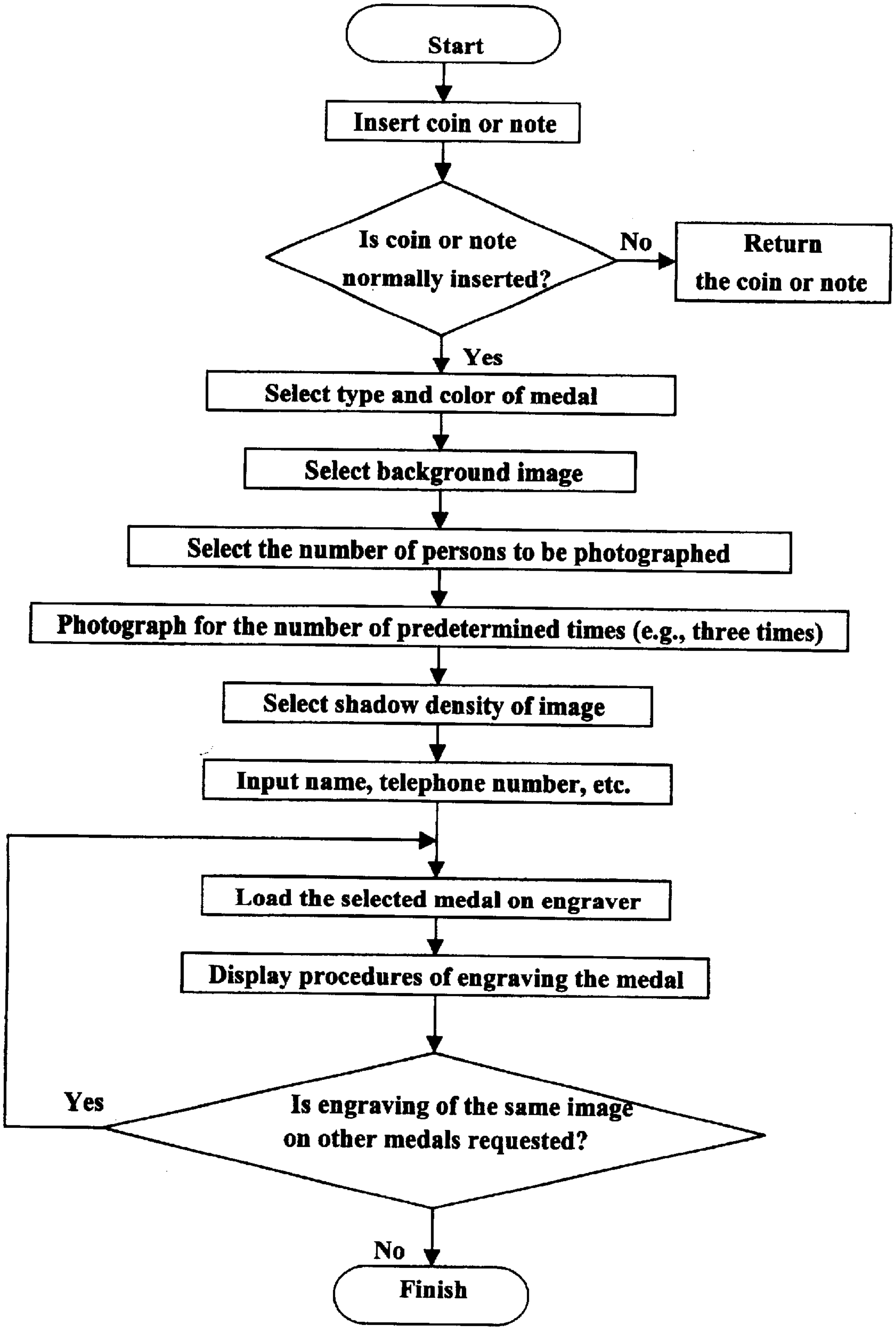
Figure 18A:
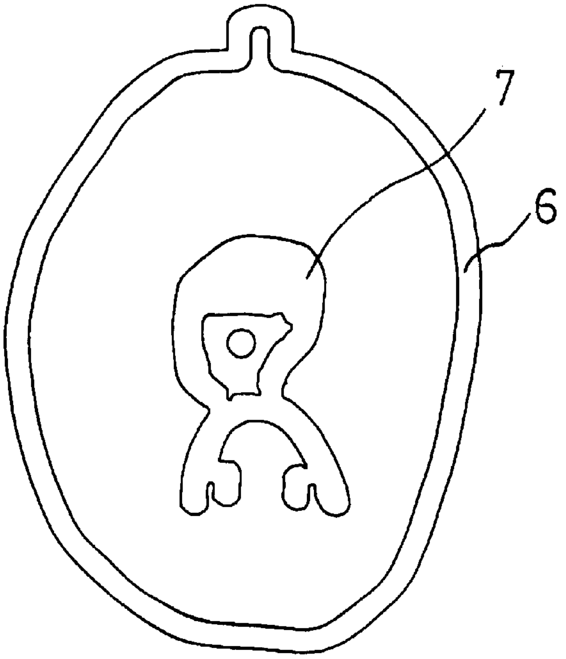
Figure 18B:
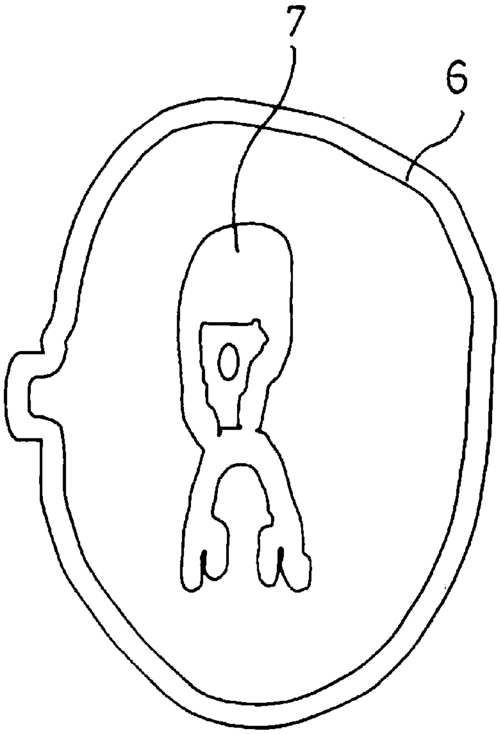

FIGS. 7*a* and 7*b* are vertical sectional views showing a part of a stacker;

FIG. 8 is a vertical sectional view showing a state where a limit switch for sensing the lift of a lifting board is provided;

FIG. 9 is a perspective view of a state that a sensing means is provided on the back face of a horizontal slider;

FIG. 10 is a perspective view of a state that a sensing means is provided to perceive ascension of a vertical slider;

FIG. 11 is a perspective view for describing the printer's operation;

FIGS. 12*a* and 12*b* are vertically sectional views showing another embodiment of the first holding means;

FIG. 13 is a perspective view showing another embodiment of the automatic medal engraver according to the present invention;

FIG. 14 is a side view of FIG. 13;

FIG. 15 is a cross-sectional view of FIG. 13;

FIG. 16 is an exploded perspective view of a part of FIG. 13;

FIG. 17 is a flow chart for describing a method according to the present invention; and FIGS. 18*a* and 18*b* are drawings, wherein the input images are arranged on imaginary medals to be engraved.

DETAILED DESCRIPTION OF THE PREFERRED EMBODIMENTS

Reference will now be made in detail to preferred embodiments of the present invention in conjunction with the accompanying drawings.

Figure 1A:
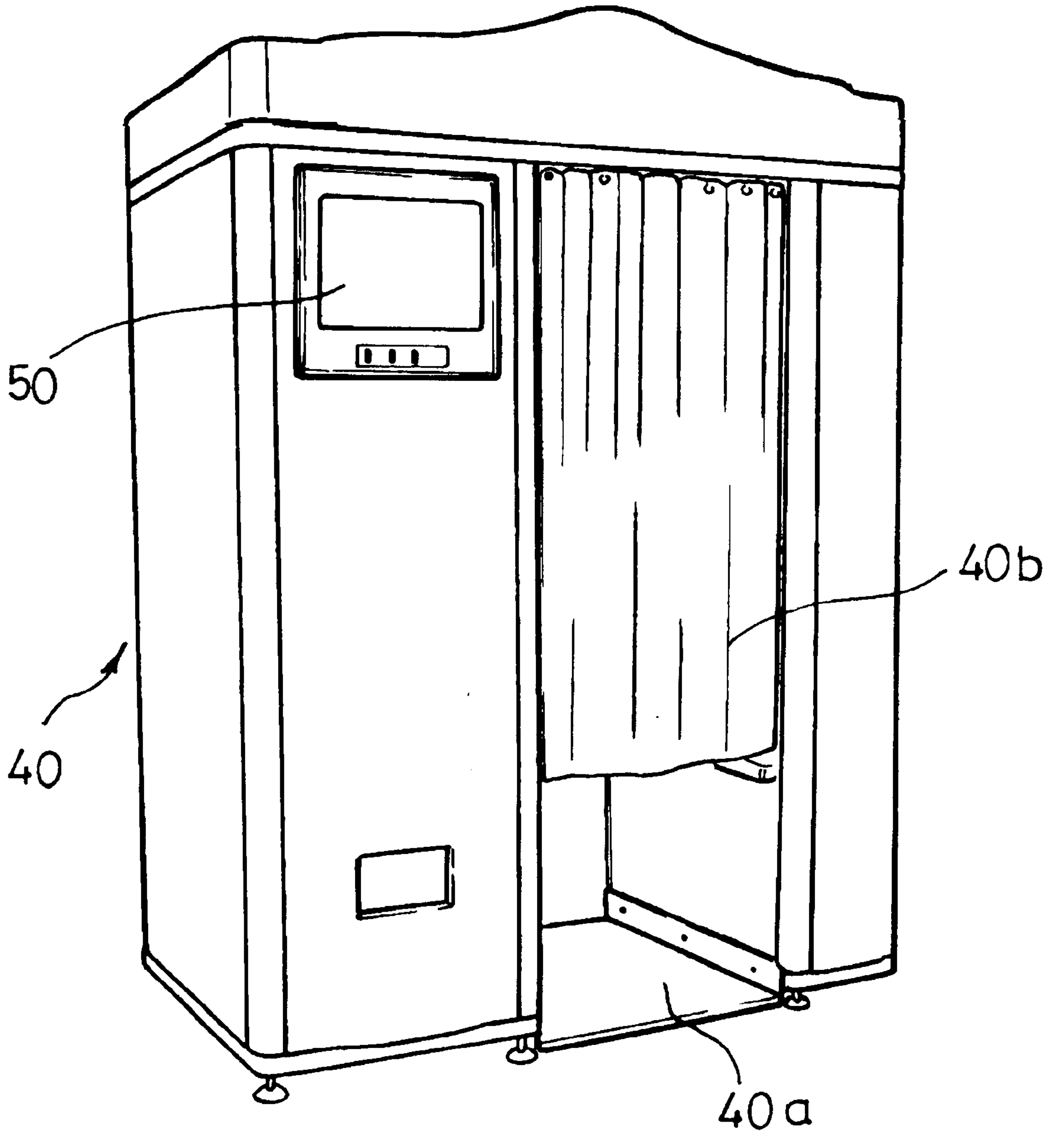
Figure 1B:
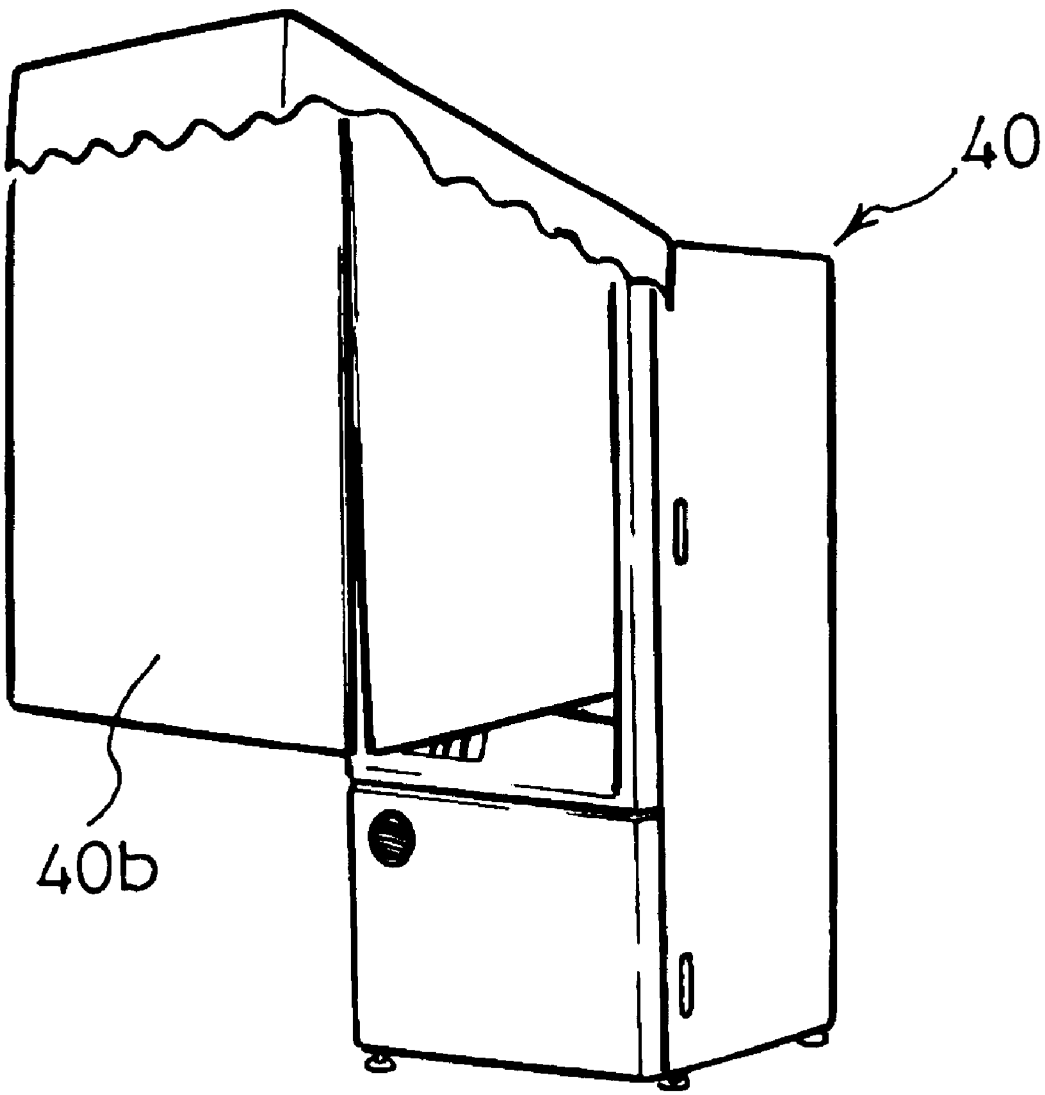
Figure 2:
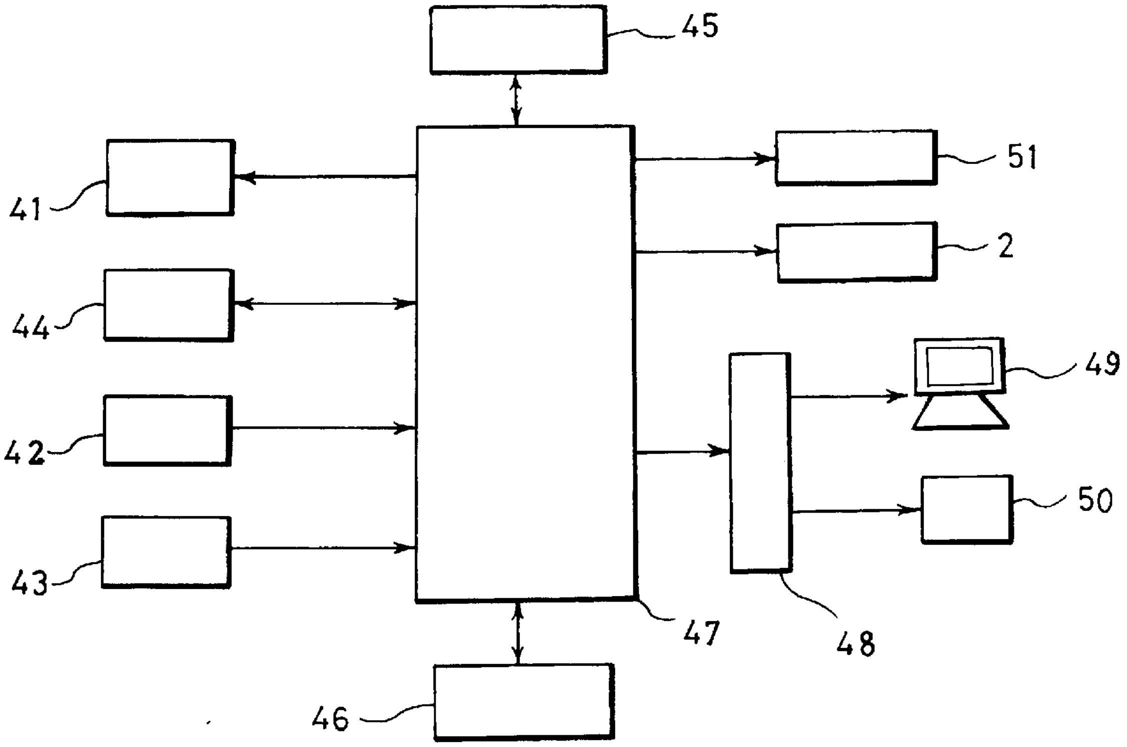
FIG. 2 is a block diagram of the vending machine according to the present invention.

FIGS. 1*a* and 1*b* are perspective views of vending machines for engraved medals according to the present invention, and FIG. 2 is a block diagram of the vending machine according to the present invention, wherein the housing (40) has a space for a controller and various devices therein and also has a doorway (40*a*) for incoming and outgoing as shown in FIG. 1*a*.

In case of FIG. 1*a*, it is possible to photograph images in a state of sitting, and in case of non-doorway as shown in FIG. 1*b*, it enables for a user to photograph in a state of standing outside by arranging a camera (44) to face outward.

In case of FIG. 1*a*, it is advantageous when the machine is installed in a relatively large site, and in case of FIG. 1*b*, it is good when a site to be installed is small.

Also, a light blocking curtain (40*b*) is provided at the doorway (40*a*) or at a photographing position in case of FIG. 1*b*.

Inside the housing (40), a plurality of lighting lamps (41) are contained to provide illuminance when photographing.

A key operating board (42) is provided at the front side of the housing (40) to input various key signals to engrave a desired image having a desired shape and color on a medal.

The vending machine according to the present invention is installed anywhere people frequently pass, and anyone is able to use the machine to engrave a desired image on the medal. If money is inserted, a money sensing part (43) is provided inside the housing (40) to recognize the value of the money inserted by the user as an electrical signal and to input the data to a controller (47).

The camera (44) is fixed on a predetermined position of the housing (40), and photographs the user's image as many times as the signals output from a controller (47), and then inputs the photographed image into the controller (47).

The controller (47) includes ROM (45) is to memorize various background images and color data as well as various programs necessary for controlling the vending machine, and RAM (46) to temporarily store various data including the image data photographed by the camera (44).

Accordingly, the controller (47) recognizes the data input from the above components and performs a predetermined control program provided from the ROM (45) to output control signals to each component, so that overall control operations are performed to engrave the desired image on the medal.

An image processor (48) is connected with the output terminal of the controller (47) and forwards various image signals (i.e., signals for images photographed by the camera and various background images, and their combination) output from the controller (47) to a user monitor (49) and an exterior monitor (50) in accordance with control signals output from the controller (47).

The user monitor (49) provided inside the housing (40) displays options including background images, photographed images and the image to be engraved, so that the user can select and input various data necessary to engrave the image on the medal.

In addition, the exterior monitor (50) provided outside the housing (40) displays procedures of engraving and types of medals as well as commercials of the vending machine to attract people's interest.

Inside the housing (40), a medal supplier (51) and an automatic medal engraver (2) are provided.

The medal supplier (51) is provided on one side of the engraver (2) and stacks a number of and various types of medals to be engraved therein, so that the medal supplier (51) loads the medal on the engraver (6) in accordance with signal output from the controller (47).

The engraver (2) engraves the desired image on the medal by embossing or intaglio by movement of a diamond tool (8) in accordance with control signal output from the controller (47) and unloads the engraved medal toward an outlet.

FIG. 3 is a perspective of the automatic medal engraver (2), FIGS. 4*a* to 4*c* are front views of FIG. 3 and FIG. 5 is a side view of FIG. 4*a*, wherein the engraver (2) is fixed on a base (1) and comprises a slider (5) which moves along an X-axis according to rotation of a ball screw (4) as shown in FIG. 11, a diamond tool (8) provided to be fixed on the slider (5), and a bed (10) provided below the slider (5) to be moved along a Y-axis according to rotation of the ball screw (9) to load the medal to be engraved thereon.

A stacker is provided on one side of the base (1) to stack the medal to be engraved and has a limit switch (12) on the bottom thereof as shown in FIGS. 7*a* and 7*b*.

The limit switch (12) detects whether the medals (6) stacked in the stacker (11) have been spent and transfers such signals to the controller (47), so that the controller (47) informs a manager of outside through a informing means (not shown) and then a manager of the vending machine can fill the stacker (11) with new medals (6).

A lamp or an alarm may be applied as an informing means whereby the controller (47) informs the user that the medals have been spent.

Moreover, the stacker (11) may be provided and arranged in a plurality of rows in which various shapes and types of medals are stacked as shown in FIG. 6, in order to satisfy the user's diverse desire.

Side plates (13) are provided in opposite at both sides of the base (1) on which the engraver (2) is fixed, a guide rail (14) is fixed between the side plates (13) and a horizontal slider (15) is provided on the guide rail (14) and moves horizontally within a predetermined section by a horizontal actuating means according to signals from the controller (47).

Thus, the horizontal slider (15) is guided by the guide rail (14) and moves horizontally by the horizontal actuating means, and the movement of the horizontal slider (15) is configured to be controlled by a detecting means (16) fixed on the back face of the horizontal slider (15) and a detecting piece (17) fixed on the side plate (13) as shown in FIG. 9.

A vertical slider (18) is fitted to a guide stick (19) fixed on the horizontal slider (15) to move up and down by a vertical actuating means.

The movement of the vertical slider (18) is configured to be controlled by a detecting means (20) fixed on the upper part of the horizontal slider (15) and a detecting piece (21) fixed on the vertical slider (18) as shown in FIG. 10.

In an embodiment, the horizontal actuating means and vertical actuating means comprise motors (22 and 23) and ball screws (24 and 25) rotating according to working of the motors and screwed with the horizontal slider (15) or the vertical slider (18), however, they are not necessarily limited to these components.

This is because they may comprise a motor as working source, a driving pulley rotating according to working of the motor, a driven pulley provided in the opposite of the driving pulley and a timing belt which is wound between the driving pulley and the driven pulley and on which the horizontal slider or the vertical slider are fixed.

On the vertical slider (18) performing lifting operation by a vertical actuating means, i.e., the motor (23), a lifting board (26) is elastically mounted by an elastic member (27) such as a spring to move up and down as shown in FIG. 8, and on the lower end of the lifting board (26), a first holding means (28) is provided to hold the medal on the stacker (11) or a bed (10).

The lifting board (26) has a pair of wing pieces (30) in a guiding groove (29) formed on the vertical slider (18) such that the lifting board (26) performs statically lifting and dropping operation without being released from the vertical slider (18).

At predetermined coordinates of the bed (10), a second holding means (31) is provided to have its upper end in line with the upper side of the bed (10) while the loaded medal (6) is engraved. A sensing means (32) is provided on the vertical slider to be operated by the lift of the lifting board (26) so that the first and second holding means (28 and 31) are driven in turn.

In FIG. 4 to FIG. 6 which show an embodiment of the first and second holding means (28 and 31), the first and second holding means (28 and 31) are constructed by using electromagnets to be magnetized as sources of electricity are impressed upon detection by the sensing means (32), wherein if one electromagnet is magnetized, the other electromagnet is demagnetized.

However, in FIGS. 12*a* and 12*b* which show another embodiment of the first and second holding means (28 and 31), a vacuum pad may be applied to adsorb the medal as vacuum pressure is generated by a small compressor (not shown) upon detection by the sensing means.

Procedures of engraving medals by using the vending machine will be hereinafter described in more detail.

FIG. 17 is a flow chart for describing the method of the present invention, wherein if a coin or a note is inserted into a inserting hole of the vending machine to engrave the desired image (7) on the medal (6), the user monitor (49) provided on the front side of the housing (40) displays messages for selecting desired type, color and size of medal.

If the user selects the desired type, color and size of medal (6) through the key operating board (42), at this time the user monitor displays various background images which can be a background of the image photographed by the camera (44) and then the user selects the desired background image through the key operating board (42).

If the user has selected the desired background image by the above procedure, the controller (47) outputs messages on the user monitor (49) in order to select the number of persons to be photographed, so that the user can input the number.

Then, if the users push a photographing button, taking their poses, the camera (44) and the lighting lamp (41) are operated for predetermined times (for example, twice to four times).

Thus, the images of the users photographed by the camera (44) are input to the controller (47) and then used as image data to engrave. Also, the image data may be generated by a scanner as well as the camera, and thus the scanned image may be input to the controller (47) of the vending machine.

If photographing has been finished for the predetermined times as in the above, the photographed images are displayed on the user monitor (49) and the user can select the desired image among the photographed images, so that the user combines the desired image with the background image selected in the prior procedure.

Thus, the user selects the photographed image or the scanned image among the images photographed by the camera or scanned by the scanner, and selects the background image on the monitor, and then the user suitably places the image (7) on the medal (6) selected in the prior procedure as shown in FIGS. 18*a* and 18*b*.

In addition, after the combination of the photographed image and the background image has been finished, the controller (47) outputs messages on the user monitor (49), the messages allowing for the user to select and input shadow density of the image to be engraved on the medal, i.e., degree of cubic effect so that the user can select and input the shadow density through the key operating board (42).

After a series of selecting procedures as in the above have been finished, if the user pushes the starting button for engraving, the horizontal slider (15) placed in the initial position as shown in FIG. 4*a*, moves along the guide rail (14) and stops, by control of the controller (not shown) according to types of the selected medal (6).

The above movement of the horizontal slider (15) is possible because the horizontal slider (15) is screwed with the ball screw (24) rotating as the horizontal actuating means, i.e., the motor (22) provided on the side plate (13) is driven, and the horizontal slider (15) combined with LM guider (33) of the guide rail (14) is placed at the upper part of one of the stackers (11) stacking the pre-selected medal (6) according to the signals input to the controller.

As the vertical actuating means, i.e., the motor (23) fixed on the upper part of the horizontal slider (15) is driven and rotates the ball screw (25), the vertical slider (18) fitted to the guide stick (19) and screwed with the ball screw (25) descends along an arrow, and then the lifting board (26) provided on the vertical slider (18) enters to the stacker (11), and thus the first holding means (28) provided on the bottom of the lifting board (26) is contacted with the medal (6) placed on the most upper part of the stacker (11).

If the first holding means (28) has been contacted with the medal (6), the lifting board (26) provided on the vertical slider (18) is lifted, and thus the sensing means (32) provided on the vertical slider (18) detects it.

Accordingly, the first holding means (28) holds the medal in the stacker (11) by magnetizing the electromagnet of the first holding means (28), or alternatively by generating vacuum pressure by the small compressor.

If the first holding means (28) has held the medal (6) in the stacker (11), the vertical slider (18) ascends until the top dead center by re-working of the motor (23), and the ascension of the vertical slider (18) is stopped as the detecting means (20) provided on the horizontal slider (15) detects the detecting piece (21) fixed on the vertical slider (18).

After the vertical slider (18) has ascended to the top dead center, the horizontal slider (15) is moved to the position of FIG. 4*b* along the guide rail (14) as the horizontal actuating means, i.e., the motor (22) is driven and rotates the ball screw (24).

After the horizontal slider (15) has been moved to the position of FIG. 4*b* by the above procedure, the vertical slider (18) descends by the working of the motor (23), so that the vertical slider (18) can load the medal (6) held by the first holding means (28) on correct coordinates of the bed (10) of the engraver (2).

When the medal (6) held by the first holding means (28) is contacted with the upper side of the bed (10), the lifting board (26) ascends to be detected by the sensing means (32), and thus the electromagnet is demagnetized, or vacuum pressure acting on the vacuum pad is released. Accordingly, the medal (6) held by the first holding means (28) is released.

At the same time, the second holding means (31) provided on the bed (10) can hold the medal (6) loaded on the bed (10) by magnetizing the electromagnet, or by generating vacuum pressure on the vacuum pad according to working of the small compressor, so that the medal (6) is not fluctuated while engraving the image (7) on the medal (6).

Then, the vertical slider (18) ascends to the top dead center by the working of the motor (23) and is standing by while the image (7) is engraved on the medal (6).

After the medal (6) has been loaded on the predetermined coordinates of the bed (10), the conventional engraver (2) engraves the image input to a computer, of which detailed description has been already described in the background of the invention.

If the image (7) has been engraved by the engraver (2), the vertical actuating means, i.e., the motor (23) is re-driven and enables the lifting board (26) placed on the top dead center to descend to the bottom dead center.

If the lifting board (26) descends and then the first holding means (28) is contacted with the medal (6) loaded on the bed (10), the lifting board (26) ascends to be detected by the sensing means (32), so that the holding state by the second holding means (31) is released and the first holding means (28) holds the medal (6) placed on the bed (10), contrary to the procedure for loading the medal (6) on the bed (10) as in the above.

After the first holding means (28) has held the engraved medal (6) when the vertical slider (18) descended to the bottom dead center, the vertical slider (18) ascends again to the top dead center by re-working of the motor (23) and the detecting means (20) detects ascension of the vertical slider (18). Then, the horizontal slider (15) is moved to the outlet position of the FIG. 4*c* by re-working of the horizontal actuating means, i.e., the motor (22).

The movement of the horizontal slider (15) is stopped as the detecting means (26) provided on the back face of the horizontal slider (15) detects the detecting piece (17) fixed on the side plate (13).

If the detecting means (26) detects that the horizontal slider (15) is placed at the unloading position as shown in FIG. 4*c*, with holing the engraved medal (6) on the first holding means (28) fixed on the lifting board, the controller releases the holding state of the first holding means (28), and thus the medal held by the first holding means (28) is dropped to the outlet by its weight, so that the user can take out the engraved medal (6).

After the engraved medal (6) held by the first holding means (28) has been taken out from the outlet, the ball screw (24) is rotated in reverse by re-working of the horizontal actuating means, i.e., the motor (22), and thus the horizontal slider (15) is moved to the initial position as shown in FIG. 4*a*.

In case that the user wishes to engrave the same image as the selected image on another medal (6), the controller (47) inquires the user to engrave the same image on another medal (6).

If the user whishes to engrave the same image on more than one medal, the vending machine repeats the procedure of loading the medal selected by the user after the engraved medal has been taken out. A series of the above procedures are performed repeatedly until the desired number of medals have been engraved.

Of course, in case that the same image is engraved on more than one medal, it is possible to be programmed to select the number of the medals to be engraved in the step for selecting type and color of the medal.

In the meantime, after the step for selecting shadow density, a step for inputting a name or a telephone number can be added, so that in addition to the selected image (7), necessary letters or numbers, for example, a name and a telephone number of child for preventing lost children can be engraved when the engraving is performed.

Moreover, when the engraving is performed by the engraver (2) after all the selecting steps have been finished, if necessary, a step for displaying the engraving procedure on the user monitor (49) and the exterior monitor (50) can be added, so that the user can confirm the engraving procedure and processing state and also, the reliability of the product can be improved.

FIG. 13 is a perspective view showing another embodiment of the automatic medal engraver according to the present invention, FIG. 14 is a side view of FIG. 13, FIG. 15 is a cross-sectional view of FIG. 13 and FIG. 16 is an exploded perspective view of a part of FIG. 13.

The embodiment in FIG. 13 differs from the other embodiment in that the medal supplier (51) for supplying the medals to the bed (10) is placed vertically behind the engraver.

The medal supplier (51) has a pair of stackers **(11*a* and 11*b*), wherein the upper ends of the stackers are opened in order to stack the medals in case of exhausting of the medals in the stackers, a pair of supplying passage (37) are provided on sides of the lower part of the stackers in order to load the medals (6) of the stackers (11*a* and 11*b*) on a loading groove (10*a*) of the bed (10) by a supplying piece (36)** moving from side to side, and the bottoms of the stackers are closed to prevent the medal from dropping.

The supplying piece (36) is screwed with a ball screw (38) rotating according to working of a motor (35) provided behind the side plate (13) and is guided to a guide stick (39), and thus is moved horizontally so that the supplying piece (36) shoves in turn the medal (6) placed on the most lower part of the stackers **(11*a* and 11*b*) and loads the medal (6) on the bed (10)**.

Also, the loading groove **(10*a*) is formed on the center of the upper side of the bed (10) on which the medal is loaded and has the second holding means (31)**.

Since the medal in the stackers **(11*a* and 11*b*) is loaded on the bed (10) by the supplying piece (36) moving from side to side, although a separate first holding means is not provided as in the above embodiment, it is possible to load the medal (6) on the loading groove (1*a*) of the bed (10)**.

An discharging piece (52) T-shaped is fixed on a connecting plate (53) fixed between the side plates (13) in order to unload the engraved medal (6) of the bed (10) toward outlet (not shown), so that the engraved medal (6) can be extracted from the bed (10) by push of the discharging piece (52) as the bed (10) is moved toward the connecting plate (53) by working of the motor (35) in a state that the second holding means (31) has released the holding state of the medal after engraving the medal.

Accordingly, if the user pushes the starting button, the bed (10) of initial position is moved to the bottom of the stackers **(11*a* and 11*b*) as the ball screw (9) rotates along a Y-axis by working of the motor (35)**.

After the bed (10) has been moved to the bottom of the stackers **(11*a* and 11*b*), the working of the motor (35) stops, and then the motor (34) provided on one side of the side plate (13) is driven such that the supplying piece (36) screwed by the X-axis ball screw (38) is moved one step to the right or left. Thus, one end of the supplying piece (36) enters to the one stacker (11*a*) via the supplying passage (37) and pushes the one medal (6) placed on the most lower part of the stacker toward the bed (10), so that the medal (6) is loaded on the loading groove (10*a*) of the bed (10)**.

After engraving the one medal, the supplying piece (36) of the standby state starts to perform repeatedly the procedure for loading the medal stacked in the other stacker as the ball screw (38) rotates in reverse.

If one medal in one of the stackers **(11*a* and 11*b*) has been loaded on the loading groove (10*a*) of the bed (10) by the prior procedures, the bed (10) is placed below the engraver (2) by working of the motor (35) provided behind the medal supplier (51) and the second holding means (31) holds the loaded medal (6)**, so that the engraver can start to engrave.

After the image (7) has been engraved by the engraver (2), the holding state of the second holding means (31) is released and the bed (10) is moved toward the connecting plate (53) by working of the motor (35), and thus the medal loaded on the loading groove **(10*a*) is dashed against the discharging piece (52) and the medal is dropped behind the bed (10)**, so that the user can take out the engraved medal.

Compared to the conventional engraver, the present invention has various advantages as follows.

Firstly, as a manager or an operator to manipulate the engraver is not required, a self-service sale using a small space is possible.

Secondly, as the vending machine can be installed in a small site, costs of operating and managing the engraver are low.

Thirdly, if necessary, a name and a telephone number can be engraved so that the medal can be used for helping missing children.

Fourthly, it is possible to make the engraved medals having the same image as many as the customer wants.

Fifthly, as loading of medals on correct coordinates of the bed to engrave desired images is possible, the position of the image to be engraved on the medal can be constant.

Lastly, as the second holding means holds the medal while the medal loaded on the bed is engraved, it is free from the inconvenience that the bilateral adhesive tape has to be removed from the back face of the medal after engraving.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. A vending machine for engraved medals comprising:

a housing; a plurality of lighting lamps contained in the housing to provide illuminance for an image; a key board for a user to input signals for engraving a medal; a money sensing part to detect payment inserted by electrical signals; a camera fixed in the housing to take photographs of the image according to signals from a controller; ROM (read only memory) in communication with the controller and in which background images and color data as well as a control programs for controlling the vending machine are memorized; RAM (random access memory) in communication with the controller and in which data is temporarily stored including image data photographed by the camera; wherein the controller recognizes data received from key board, the money sensing part, the camera, the ROM, and the RAM, performs the control program provided by the ROM, and outputs control signals; an image processor forwards image signals output from the controller to a monitor and an exterior monitor; wherein the monitor displays messages by which the user can input necessary data including background images, a photographed image and an image to be engraved at each stage under the control of the image processor; wherein the exterior monitor is provided outside the housing and displays procedures of manufacture and a type of the medal and commercials for the vending machine under the control of the image processor; a medal supplier to provide a medal to an engraver in accordance with output signals from the controller; and wherein the engraver automatically engraves the photographed image on the medal by at least one of embossing and intaglio in accordance with control signals output from the controller.

2. The vending machine for engraved medals as claimed in claim 1, wherein the engraver comprises: a diamond tool provided on a slider which moves along an X-axis and engraves the images on the medal; a bed provided on a base below the slider to move along a Y-axis and to have the medal loaded thereon; a stacker provided on one side of the base to contain unengraved medals thereon; side plates provided opposite each other on both sides of the base; a horizontal slider provided on a guide rail fixed between the side plates to move horizontally within a section predetermined by a horizontal actuating means; a vertical slider fitted to a guide stick fixed on the horizontal slider to move up and down by a vertical actuating means; a lifting board elastically mounted on the vertical slider by an elastic member to move up and down; a first holding means of medals provided on the lower end of the lifting board to hold the medal on at least one of the stacker and the bed; a second holding means having an upper end in line with an upper side of the bed at predetermined coordinates to hold the medal while the medal is being engraved; and a sensing means mounted on the vertical slider to be operated by the lift of the lifting board so that the first and second holding means are driven in turn.

3. The vending machine for engraved medals as claimed in claim 2, wherein the first and second holding means are electromagnets to be magnetized by the input of electric power upon detection by the sensing means.

4. The vending machine for engraved medals as claimed in claim 2, wherein the first and second holding means are vacuum pads to adsorb the medal as vacuum pressure is applied by the detection of the sensing means.

5. The vending machine for engraved medals as claimed in claim 2, wherein the stacker arranges a plurality of rows of medals having different shapes and types.

6. The vending machine for engraved medals as claimed in claim 2, wherein the stacker has a limit switch on a bottom surface thereof, and the limit switch detects whether the medals on the stacker have been spent and informs a manager of the detection by an informing means.

7. The vending machine for engraved medals as claimed in claim 6, wherein the stacker arranges a plurality of rows of medals having different shapes and types.

8. A method of automatically engraving medals by a vending machine comprising the steps of:

detecting whether payment is suitably inserted; if payment has been normally inserted, selecting a type and color of a medal according to messages on a monitor; selecting a desired background image on the monitor which displays background images memorized in ROM; selecting and inputting a number of persons to be photographed and a number of shots; photographing the persons with a camera for the number of shots to obtain photographed images; selecting an image to be engraved from among the photographed images and combining the selected image with the selected background image; selecting shadow density of the image to be engraved on the medal; loading the selected medal on an engraver; engraving the image on the medal using the engraver; and unloading and taking out the engraved medal from the engraver.

9. The method of automatically engraving medals by the vending machine as claimed in claim 8, further comprising the step of inputting at least one of a name and a telephone number to be engraved on the metal.

10. The method of automatically engraving medals by the vending machine as claimed in claim 8, further comprising the step of displaying the procedures of engraving on the monitor during the step of engraving the medal.

11. The method of automatically engraving medals by the vending machine as claimed in claim 8, wherein if the user wishes to engrave the selected image on more than one medal after engraving the medal, the number of the medals to be engraved is selected in the step of selecting the type and color of the medal, and it is detected whether further engraving of the same image on other medals is requested; and if yes, the step of loading the selected medal is repeated.

* * * * *